Patented Mar. 7, 1933

1,900,882

UNITED STATES PATENT OFFICE

OSCAR W. LUSBY, OF BALTIMORE, MARYLAND, ASSIGNOR TO WILBERT J. HUFF, OF BALTIMORE, MARYLAND

CATALYSTS FOR THE REMOVAL OF ORGANIC SULPHUR COMPOUNDS FROM GASES

No Drawing. Application filed January 28, 1928. Serial No. 250,338.

The present invention relates to the removal of organic sulphur compounds from gases and has particular reference to catalysts for the conversion of organic sulphur compounds to hydrogen sulphide, which is easily removable from the gas by known methods.

The removal of organic sulphur from gases has heretofore been attempted through the use of solutions or solid absorbents, or by the use of such catalysts as nickel at elevated temperatures. The removal of organic sulphur is important in connection with the purification of gas for domestic use and especially in connection with the purification of gas to be used in the synthesis of organic compounds by catalytic methods.

I have discovered that catalysts comprising certain combinations consisting originally of metals, or their oxides or hydroxides, of the sixth group with metallic elements, or their oxides or hydroxides, of the fourth and fifth groups of the periodic system according to Mendeleef as shown in the table on pages 474 and 475 of the Chemical Rubber Handbook of Chemistry and Physics by Hodgman and Lange, 13th edition, 1928, are extremely active and permanent. These catalysts are preferably operated above 200° C., no upper limit being specified when the organic sulphur is not accompaned by hydrogen sulphide. It has been found, however, that there is a tendency at high temperatures to synthesize organic sulphur when hydrogen sulphide is present in the gas and that at suitable space velocities, the substantially complete conversion of the organic sulphur to hydrogen sulphide, even in the presence of additional amounts of hydrogen sulphide, can be effected at lower temperatures.

I have further found that oxides of elements of the sixth group of the periodic system, when combined with oxides of elements of other groups, especially of the first to fifth groups, inclusive, are especially effective in the conversion of organic sulphur into hydrogen sulphide. For instance, experiments have indicated to be effective combinations consisting originally of mixtures of the oxides or hydroxides of the metals, as follows:—those of uranium, with those of cerium, copper, antimony, and other metals; those of chromium with those of copper, cerium, thorium, and other metals; and those of tungsten and molybdenum with those of metals of other groups of the periodic system. The composition, based on the content of the metals, of the combinations which have been especially satisfactory are:

50% uranium and 50% copper
80% uranium and 20% cerium.

It is observed that the combinations specified include mixtures consisting initially of intimate mixtures of at least one metal included in the sixth and seventh groups of the periodic system with at least one metal of the first to fifth groups, inclusive, of the periodic system, exclusive of the rare metals having an atomic number less than 58.

The catalysts may be coated on a carrier, such as pumice or broken firebrick, or used without a carrier. When a carrier is employed, the catalysts may be prepared by the addition of solutions of the nitrates or other compounds of the components of the catalysts to a carrier and heating the mixture to decompose the compounds, leaving an intimate mixture of the oxides of the metals on the carrier, or they may be precipitated on the carrier from solutions of their salts, such as their nitrates. When no carrier is used, the catalysts may be prepared in a form resistant to crumbling, either by precipitation from a mixture of solution of salts of their components, and subsequently washing and compressing the precipitate, or, in certain of the combinations above mentioned, by fusion of the intimately mixed oxides of the metals, or the metals themselves.

In the course of the researches leading to this invention I have found that certain organic sulphur compounds, such as thiophene, which are affected but little, if any, by the action of nickel or other known catalysts, may be converted into hydrogen sulphide, although at a somewhat lower rate than when the organic sulphur consists exclusively of carbon disulphide.

Wherever in the claims the term metal is used, or a particular metal is specified, I intend to cover thereby not only the metal but also its equivalents as set forth in the specification, viz. its oxides and its hydroxides.

Having described my invention, I claim:—

1. The process for preparing a catalyst for the conversion of organic sulphur compounds to hydrogen sulphide consisting of subjecting a mass consisting orginally of an intimate mixture of at least one metal included in the sixth and seventh groups of the periodic system of the elements with at least one polyvalent metal of the first to fifth groups of the periodic system, exclusive of rare metals having an atomic number less than 58, to the action of a gas containing hydrogen and organic sulphur at a temperature above 200° C.

2. A catalyst for the conversion of organic sulphur compounds to hydrogen sulphide consisting of the product obtained from a mass consisting originally of an intimate mixture of at least one metal included in the sixth to seventh group of the periodic system with at least one polyvalent metal included in the first to fifth groups, inclusive, of the periodic system, exclusive of rare metals having a periodic number less than 58, reacted with a gas containing hydrogen, organic sulphur and hydrogen sulphide at a temperature over 200° C.

3. A catalyst for the conversion of organic sulphur compounds to hydrogen sulphide consisting of the product resulting from subjecting a mixture consisting originally of an intimate mixture of at least one metal included in the sixth group of the periodic system with at least one polyvalent metal included in the first to fifth groups, inclusive, of the periodic system exclusive of rare metals having an atomic number less than 58, to the action of a gas containing hydrogen and organic sulphur at a temperature over 200° C.

4. A catalyst for the conversion of organic sulphur compounds to hydrogen sulphide which consists of the solid product resulting from the action of gas containing hydrogen and organic sulphur on a mass consisting of an intimate mixture of uranium with at least one polyvalent metal included in the first to fifth groups, inclusive, of the periodic system, exclusive of rare metals having an atomic number less than 58, at a temperature over 200° C.

5. A catalyst for the conversion of organic sulphur compounds to hydrogen sulphide which consists of the solid product resulting from the action of a gas containing hydrogen and organic sulphur on a mass consisting originally of an intimate mixture of at least one metal included in the sixth group of the periodic system with copper at a temperature over 200° C.

6. A catalyst for the conversion of organic sulphur compounds to hydrogen sulphide which consists of the solid product resulting from the action of a gas containing hydrogen and organic sulphur compounds on a mass consisting originally of an intimate mixture of at least one metal of the sixth group of the periodic system with cerium, at a temperature above 200° C.

7. A catalyst comprising the product resulting from the action of a gas containing hydrogen and organic sulphur compounds on a mass consisting originally of an intimate mixture of uranium with cerium.

8. A catalyst for the conversion of organic sulphur compounds to hydrogen sulphide which consists of the solid product resulting from the action of a gas containing hydrogen and organic sulphur compounds on a mass produced by the fusion at a high temperature of a mixture consisting initially of an intimate mixture of a metal of the sixth group of the periodic system of the elements, and a metal of the first to fifth groups of the periodic system, exclusive of rare metals having an atomic number less than 58, said action of the gas taking place at a temperature above 200° C.

In testimony whereof I hereunto affix my signature.

OSCAR W. LUSBY.